United States Patent [19]
Gardner

[11] 4,021,779
[45] May 3, 1977

[54] MICROPROGRAM CONTROL UNITS

[75] Inventor: Peter Lycett Gardner, Tottlebank, England

[73] Assignee: International Business Machines Corporation, Armonk, N.Y.

[22] Filed: Nov. 13, 1975

[21] Appl. No.: 631,547

[30] Foreign Application Priority Data
Nov. 27, 1974 United Kingdom ............ 51369/74

[52] U.S. Cl. .......................................... 340/172.5
[51] Int. Cl.² ......................................... G06F 9/16
[58] Field of Search .................... 340/172.5; 445/1

[56] References Cited
UNITED STATES PATENTS

| | | | |
|---|---|---|---|
| 3,404,378 | 10/1968 | Threadgold et al. | 340/172.5 |
| 3,792,441 | 2/1974 | Wymore et al. | 340/172.5 |
| 3,913,074 | 10/1975 | Homberg et al. | 340/172.5 |
| 3,930,236 | 12/1975 | Ferguson et al. | 340/172.5 |
| 3,953,833 | 4/1976 | Shapiro | 340/172.5 |

Primary Examiner—Harvey E. Springborn
Attorney, Agent, or Firm—Bernard M. Goldman

[57] ABSTRACT pg,1 A microprogram control unit comprises a microprogram store and an interactive processor processing the micro instructions issued by the microprogram store to produce expanded system control signals, at least some of the processing elements of the interactive processor being each responsible for producing a unique subset of control signals, no other processing element being directly involved in producing control signals in that subset. The processing elements may be self-sequencing stores, the micro instruction supplying the initial entry point for each store may be provided with its own automatic looping facility.

5 Claims, 3 Drawing Figures

MICROPROGRAM CONTROL UNITS

INTRODUCTION

The present invention relates to microprogram control units controlling the sequence of elementary operations within information handling systems.

A substantial percentage of all computers built in recent years have utilized microprogrammed control units to control the operations performed by a central processing unit (CPU) during the execution of an instruction. Under control of the microprogrammed control unit, the instruction is executed by the performance of a sequence of elementary operations in a sequence of CPU cycles, each elementary operation being completed within a single CPU cycle. During each of these cycles, elementary operations are performed under the control of a microinstruction which has been accessed from the control unit. Generally, within a single CPU cycle, more than one elementary operation is performed (in parallel and/or in sequence within the cycle). Each elementary operation is performed under control of a "micro-order". A microinstruction thus contains a plurality of micro-orders, each of which is performed during one CPU cycle. A sequence of microinstructions which execute a given function (for example, a software instruction) make up a microprogram or micro-routine.

In most microprogrammed systems, microinstruction sequencing is achieved by allocating a portion of each microinstruction for indicating the address of the next microinstruction to be performed. The next address portion is fed, along with branching controls, to the address register of the control storage in order to select the next microinstruction to be performed. In such a system, if a given microninstruction is used in several different micro-routines, the instruction may be stored at several different places within a microprogram control storage. This replication is one factor which tends to increase the size of the control unit.

Another factor which affects the size of the control unit is micro-order density. Within each microinstruction, various fields are allocated to specific types or classes of micro-orders. If, within a given microinstruction, then the field or fields allocated thereto will contain no information that is of substantial use to the system. The presence in the microprogram storage of fields which, in effect, contain no information of value to the system also tends to increase the size of the control unit.

A particular instance of decreased efficiency in a control store subsystem in connection with the above cited aspects concerning addressing and branching is realized when a new sequence of microinstructions must be initiated in response to a new system instruction. During the execution of a particular system instruction, a number of conditions may have to be fulfilled before execution of the next system instruction can be initiated. At the conclusion of a microprogram, a particular microinstruction must be decoded to indicate that the execution of the present system instruction is completed before the operation code of the next instruction can be examined and used to control the start of the next microinstruction sequence. This requires one complete system cycle to make this determination and the particular microinstruction indicating the end of the operation (EOP) does very little additional effective work.

In addition to effectively losing a machine cycle for the purpose of determining whether or not an operation has been completed on a particular system instruction, additional inefficiency is realized at the time the operation code of the next instruction to be executed is analyzed. In prior systems, at least a portion of the operation code (OP CODE) is utilized to form the address of the first microinstruction of the sequence required to perform the system instruction. When utilizing this technique, a number of binary bit positions must be set aside in each microinstruction to be effective only for analyzing the OP CODE to provide the ability to perform a 64-way branch. These binary bit positions in all other microinstructions are, in effect, wasted.

A general discussion relating to the method of implementing a microprogram control storage can be found in an article entitled "Microprogram Control For System/360" by S. G. Tucker, found in the IBM Systems Journal, Vol. 6, No. 4, 1967, pages 222-241 (IBM is a Registered Trade Mark). This article is herewith incorporated by this reference for its showing of the methods of control store addressing, division of microinstructions into various fields, and methods of decoding and branch decision making.

In order to reduce the microinstruction word length, decoding circuitry is used which, in effect, recognizes a particular signal pattern (part of a microinstruction) and automatically generates a larger signal pattern (the expanded or full set of control signals required by the processing elements of the processor). Such decoding circuitry would have to be altered or replaced each time any instruction is altered in such a way that a new control signal pattern is required. This means that, once defined, there is a high cost overhead involved in updating the microinstruction set.

SUMMARY OF THE INVENTION

With these drawbacks in mind, the present invention provides a microprogram control unit comprising a microprogram store and an interactive processor processing the microinstructions issued by the microprogram store to generate expanded system control signals directly, at least some of the processing elements of the interactive processor producing control signals related to only a particular processing subfunction.

The processing elements of the interactive multiprocessor may comprise stores, the addressing mechanism of which are responsive to the output of the microprogram store and self-generated control signals.

One advantage of such an arrangement will become clear when one realizes that, at any one point in a microinstruction cycle, many, if not most, of the processing elements are idle. In conventional arrangements, a processing element only requires a control signal when that processing element is required to be active, this applying equally to the processing elements of the processor as to the processing elements of the interactive processor. It follows that appropriate association of processing elements of the interactive processor with processing elements of the processor can eliminate most of the blank spaces required in the microprogram stores of the prior art. The need for decoding circuitry for expanding all control signals produced by the control unit is also eliminated.

Further, relative to the decoding circuitry of the prior art, the presently proposed system can be altered, within certain limits, by writing fresh data into the interactive processor.

DESCRIPTION OF THE DRAWINGS

The present invention will be described further by way of example with reference to an embodiment hereof as illustrated in the accompanying drawings in which.

EMBODIMENT INTRODUCTION

For those not so skilled in the art to gain an appreciation of the invention, there will now be given a very brief explanation of a data processor and how it works. Those skilled in the art will realize that it is well within their skill to apply the invention to their own data processors as soon as the control microcode is defined for those processors.

Figure 1:
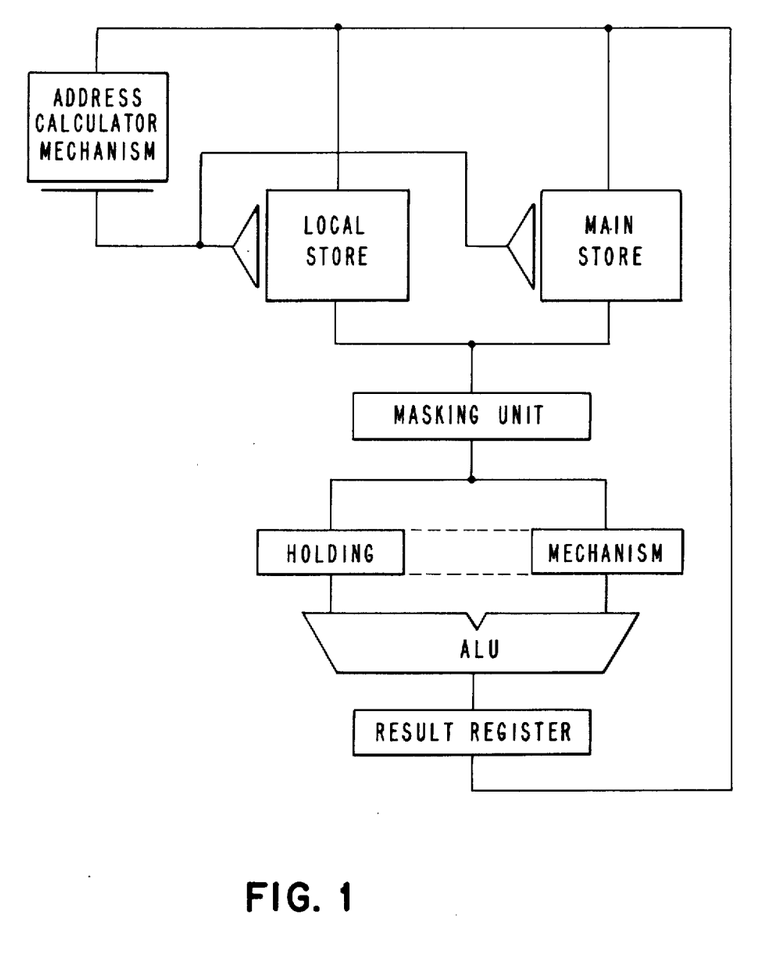
FIG. 1 is a diagram of a simple conventional data processor.

A data processor in its simplest form comprises a local store and a main store into each of which data can be written and from which data can be read, together with an arithmetic and logic unit (ALU) which can function to combine and alter data in a selected one of a limited number of ways. The basic cycle of operation starts in one or both of the stores with the reading of one or more items of data called operands which is or are supplied to and modified by the ALU, the resultant item of data being returned to and written into one or other of the stores. In order to speed processing, it is usual to incorporate a separate mechanism capable of calculating the address of the locations in the stores to be accessed without requiring the services of the ALU, together with a masking unit with a mechanism for selecting part only of an item of data, a holding mechanism for retaining one operand until a second operand with which it is to be combined is available and a result register for holding the output of the ALU until the store into which it is to be written (or sometimes the addressing mechanism) is available to receive it. All these items are linked together by data paths which are controlled by gates providing a general configuration of the kind shown in FIG. 1 and which forms no part of the present invention.

The operations to be performed are defined by instructions written into one or other data store and the whole processor is controlled by a microprogram control unit which examines an instruction and generates sequences of sets of signals which travel along a distribution network of conductive paths to the various elements of the processor, an element only operating when it receives an appropriate control signal. Although the microprogram control unit only causes processing operations in response to instructions, one of its tasks is to cause those instructions to be read from the storage locations where they are stored.

From the above it will be apparent that the various elements of a processor do not have the same work rate. For example, if the gates are regarded collectively as an element, they have a high work rate since any flow of data between two elements requires the opening of at least one gate. On the other hand, the holding mechanism has a low work rate since it only has to hold an operand while a second operand is produced and when only one operand is required, the holding mechanism is not used at all.

A further point that must be appreciated is that some elements require not one but a sequence of control signals in order to perform properly, this being particularly true of the data stores.

Suppose therefore, that the microprogram control unit were to generate at any instant a set of signals, some being significant (=1) and some being non-significant (=0), sufficient to define the entire operating state of the elements of the processor, then the majority of such signals will be 0. When any change, however small, in the spectrum of operating states is required, a whole new set of signals will have to be generated and still the majority of such signals will be 0. What happened conventionally was that all possible sets of control signals that could be required were written as words into a store (microprogram store) and were read out, one at a time, in an appropriate order, at a rate equal to the rate of change of the operating states of the elements of the processor. This resulted in a larger store having to be provided to store signals which were predominantly non-significant even though non-operation of an element could be achieved just as well by not sending it any signal at all.

The present invention is based on the realization that the elements of a processor are operative in groups and aims for the condition in which no control signals at all are generated for any group that is for the time being quiescent. It does this by providing a microprogram control unit which contains a number of processor function units, ideally one processor functional unit for each operating group of elements of the data processor to be controlled, arranged to generate control signals for that group only. This means that when the group is quiescent, so is the associated processor functional unit of the microprogram control unit but this also means that the microprogram functional units must be interactive at least in so far as those units which are active must be responsible for rendering active another quiescent processor functional units at the appropriate time.

Further, since for any operating group of elements of the data processor, the necessary subsets of control signals tend to be organized into short sequences some of which are repeated, it is convenient to use for at least some of the microprogram processor functional units stores which can be either self-addressing or which can be caused to respond to external addresses since then a repeated sequence need only be stored once.

THE DETAILED EMBODIMENT

The microrogram control unit now to be described in some detail uses five such stores and so one of those stores will be described just in isolation with reference to FIG. 2 before the inter-relationship of the five stores and the other elements of the microprogram control unit is described with reference to FIG. 3. Thus, in connection with the store of FIG. 2, three control signals ($X_i Y_i Z_i$) for the store itself will be referred to and the origin of these control signals will not become apparent without reference to FIG. 3.

Figure 2:
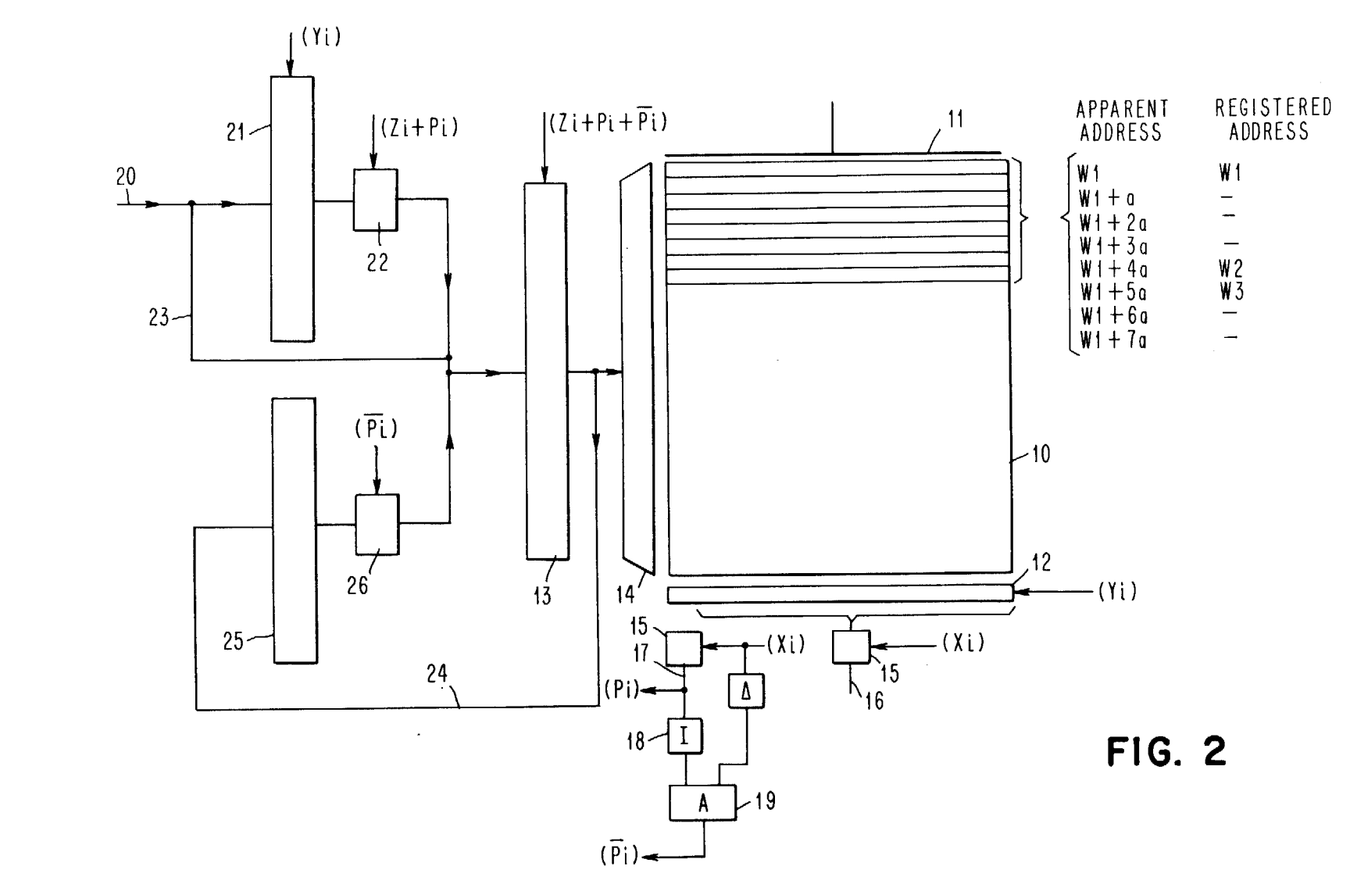
FIG. 2 is a diagram of a unit used five times in the circuitry of FIG. 3.

The unit of FIG. 2 comprises a conventional writable, non-destructive readout data store having a storage matrix 10, an input register 11, an output register 12, an address register 13 and an address decoder 14. The store responds to control and timing signals (not shown) either to write data from input register 11 into, or to read data into output register 12 from, a word location in matrix 10 identified by an address in address register 13 when gated into address decoder 14. In addition to the purely conventional aspects of the store, there is provided pre-addressing circuitry and post-output circuitry. The post-output circuitry comprises AND gates 15 enabled by control signals ($X_i$) gating one bit position of the output register 12 onto line 17 and the remaining bit positions of the output register 12 onto a multiple line data path 16 (shown as a single line in FIG. 2). The output register 12 is resettable by control signals ($Y_i$). Line 17 carries a signal ($P_i$) and branches, one branch incorporating an invert circuit 18 and an AND gate 19 enabled by ($X_i$) delayed by delay circuit, these combining to produce a single pulse ($\overline{P}_i$) each time ($X_i$) is present and the bit position of output register 12 gated onto line 17 contains a "o". The ($P_i$) and ($\overline{P}_i$) signals are fed back to the pre-addressing circuitry.

The pre-addressing circuitry comprises an address input path 20 connected to a pre-address register 21 resettable by control signal ($Y_i$). The output of register 21 is gated by gate 22 both to address register 13 and back to itself via path 23. Gate 22 is enabled by control signals ($Z_i + P_i$) i.e. either $Z_i = 1$ or $P_i = 1$. Address register 13 is resettable by control signals ($Z_i + P_i + \overline{P}_i$) and also connects via path 24 to an incrementing register 25 in turn connected back to address register 13 via gate 26 enabled by control signal ($\overline{P}_i$).

Ignoring the entry of data into matrix 10, which is conventional, the reading operations of this unit proceed as follows:

a. an address on path 20, and ($Y_i$), result in the address being entered into pre-address register 21.

b. ($Z_i + P_i$) enables gate 22 to enter this address into address register 13 (it being also returned to register 21) and a read cycle is initiated causing the read word to be entered into and retained in output register 12. Also the address from register 13 is entered into incrementing register 25 and incremented therein by a fixed amount.

c. ($X_i$) will cause the word in output register 12 to appear part on line 17 and part on path 16. If line 17 receives "o", ($\overline{P}_i$) will be generated causing the contents of incrementing register 25 to be gated by gate 26 into address register 13 and a read cycle to be initiated.

If line 17 received 1, $P_i$ will be generated and the contents of pre-addressing register 21 will be gated by gate 22 into address register 13 causing a read cycle to be initiated, the store bit causing line 17 to be raised being sometimes referred to as a "P bit" when ($P_i$) is generated.

It follows that for a given address (W) entered on path 20 and a sequence (not necessarily at regular time intervals) of control signals ($X_i$), the words from locations W, W+a, W+2a, W+3a ... will be gated onto path 16 until a word is gated out which produces a 1 on line 17, whereupon the next word gated out will be that from location W and the sequence will repeat. When a new starting address is to be used, ($Y_i$) also resets output register 12 so that all of the previous read sequencing is removed from the unit. Thus assuming address-consecutive locations in matrix 10 contain words having one bits gatable onto line 17 from words (W+3a), (W+4a), (W+7a), successive ($X_i$) signals can never cause the word at location ($W_1 + 4a$) to be accessed since the presence of the 1 bit the in word at ($W_1 + 3a$) will cause, other things being equal, the next ($X_i$) to enter the word at ($W_i$) into register 12. To access the word at ($W_1 + 4a$) a new address ($W_2$) on path 20 will be required. In fact, although the first four words shown can be accessed in repetitive sequence from starting address ($W_i$) only the fifth word can be accessed by address ($W_2$) and address ($W_3$) is required to access words in the sixth, seventh and eighth locations. It follows that where two such units are connected together in such a way that one unit generates the ($X_i$) signals for the other unit, the operation of the second unit is determined in part by the last address it received on path 20, in part by its own contents, and in part by the contents of the first unit. Put pictorially, this means that without interactive units the mapping of two interrelated repetitive sequences of control signal fields $F_i$ and $f_i$ would be typically as follows:

| | | |
|---|---|---|
| $F_1$ | — | |
| $F_2$ | — | |
| $F_3$ | $f_1$ | |
| $F_4$ | — | |
| $F_5$ | $f_2$ | |
| $F_6$ | — | The first eight pairs of elements is |
| $F_7$ | — | the basic combined repetition and the |
| $F_8$ | $f_3$ | map will contain as many multiples of |
| $F_1$ | — | this submap as are required. |
| $F_2$ | — | |
| $F_3$ | $f_1$ | |
| $F_4$ | — | |
| $F_5$ | $f_2$ | |

Using two interactive units, one for $F_i$ and the other for $f_i$ with the $F_i$ unit generating ($X_i$) signals for the $f_i$ unit, each unit having its own P bit, we now have two maps:

| | | | | |
|---|---|---|---|---|
| $F_1$ | — | — | | |
| $F_2$ | — | — | | |
| $F_3$ | $X_i$ | — | $f_1$ | — |
| $F_4$ | — | — | $f_2$ | — |
| $F_5$ | $X_i$ | — | $f_3$ | P |
| $F_6$ | — | — | | |
| $F_7$ | — | — | | |
| $F_8$ | $X_i$ | P | | |

The foregoing chart also illustrates another requirement, namely some means for stopping or breaking out of cycling sequences of control signals the arrangement described so far will not do so of itself. What is required is a testing mechanism. It may be that it is known beforehand how many cycles ae required, as in multiplication when the number of cycles is a function of the number of bits in an operand, in which case a cycle count can be compiled and tested for equality to the known number, equality causing breakout. It may be that breakout is required when certain states occur in the processor to be controlled as for example in division when the resultant from the ALU is negative. The provision of a suitable testing mechanism can also handle what can be termed "extraordinary events" such as a detected error, an externally generated interrupt as well as routine processing tests such as "is the selected bit 0 or 1". The preferred testing mechanism used in the microprogram control unit illustrated in FIG. 3 comprises a unit of the kind shown in FIG. 2, which identifies the test, coupled to an associative store which performs the test receiving information signals from appropriate areas of the processor. Associative stores are well known in many forms.

Figure 3:
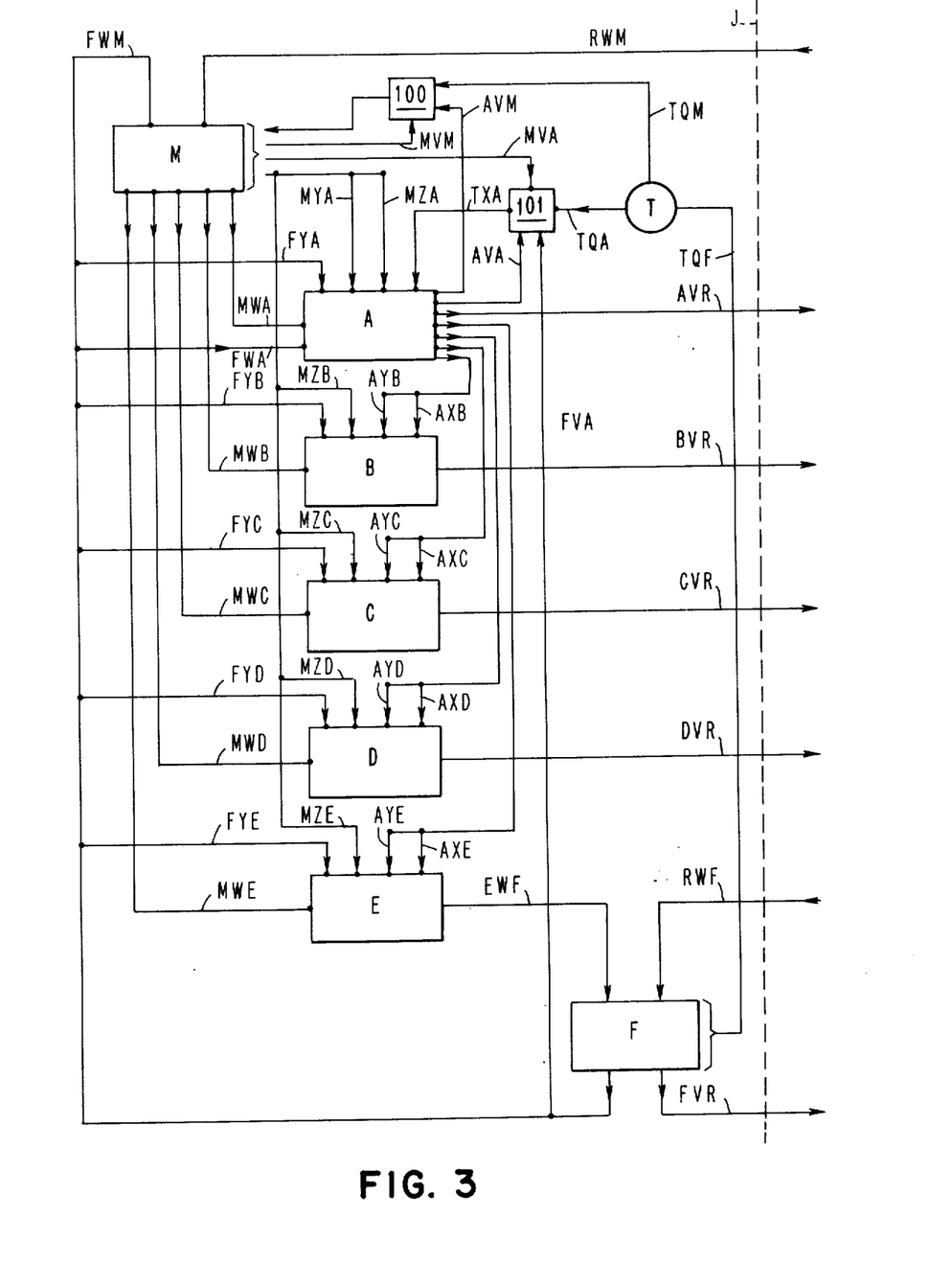
FIG. 3 is a diagram of one kind of microprogram control unit according to the present invention.

Briefly therefore the microprogram control unit of FIG. 3 comprises five of the units illustrated in FIG. 2, and referenced A, B, C, D and E. Unit A acts as control signal generator for the gates of a processor. Unit B acts as control signal generator for the stores of the processor. Unit C acts as control signal information generator for the masking mechanism of the processor. Unit D acts as control signal generator for the ALU of the processor. Unit E in association with associative store F comprises the testing mechanism. The starting addresses applied to the preaddressing circuitry of units A to E are derived either from a micro-program store or from the associative store F. The (X), (Y) and (Z) control signals for the units A to E are generated within the microprogram control unit itself.

The convention is used in FIG. 3 that, for unit A to E, the addresses for address input path 20 are shown supplied to the left-hand side of the unit, the control signals (X), (Y), and (Z) are shown supplied to the top of the unit and the output fields are shown leaving the right-hand side of the unit.

Turning now to the microprogram control unit illustrated diagrammatically in FIG. 3 it will be seen that it comprises a conventional microprogram store M, a clock T, five units of the kind illustrated in FIG. 2, and referenced A, B, C, D and E, an associative store F and a notional interface J, the processor R to be controlled being understood as lying to the right-hand side of the interface J in FIG. 3. To simplify the description and understanding of the microprogram control unit, signals will be referred to according to the following triple cypher, the line or path for flow of such signal also being referenced by the same cypher:

SOURCE TYPE DESTINATION

Where the source is either R (the processor), M, A, B, C, D, E, F, or T; the type is either Q (timing), W (address), V (control), X, Y or Z; the destination is either R, M, A, B, C, D, E or F. Thus FWM is an address supplied by associative store F to microprogram store M. Search fields for the associative store F are regarded as addresses W. Where a path is common to a number of signals, it will not be referenced. Each unit produces P and $\bar{P}$ signals which are regarded as being internal to the respective units and are not especially shown in FIG. 3.

The microprogram unit produces an output word (MWA, MWB, MWC, MWD, MWE) and has its own timing mechanism about which more will be said later. Unit A produces an output word (AVA, AVM, AVR, AXB, AYB, AXC, AYC, AXD, AYD, AXE, AYE). Unit B produces an output word (BVR), as do unit C (CVR), unit D (DVR) and unit E (EWF). Associative store F produces an output word (FVR, FWM, FWA, FYA, FYB, FYC, FYD, FYE, FVA). Signals RWM and RWF are derived from the interface J and Signals AVR, BVR, CVR, DVR and FVR are passed to the interface. The clock T produces outputs (TQM, TQA, TQF).

The timing mechanism of microprogram store M is free running for one complete cycle once initiated by control logic 100 which passes TQM from AVM = 1 until a signal MVM = 1, MVM being derived from the timing mechanism at the end of each read cycle of the microprogram store.

Suppose TQM presents itself at times $t_0 t_1 t_2 t_3 t_4$ and so on regularly from AVM = 1 until MVM = 1 and suppose it takes two time intervals to settle a new address in the address mechansim of the store M, four time intervals to decode such address, six time intervals for the store to pass the contents of the location identified by the decoded address to the output of store M, two time intervals for such output to reach units A to E and one time interval for the appropriate registers 21 of the units (see FIG. 2) to react. The timing cycle of the timing mechanism of the store M will be as follows AVM = 1 to define time $t_0$:

| TIME | FUNCTION | SIGNAL |
|---|---|---|
| $t_0$ | enter new address | internal control signal |
| $t_1$ | | — |
| $t_2$ | | internal control signal |
| $t_3$ | | — |
| $t_4$ | decode address | — |
| $t_5$ | | — |
| $t_6$ | | internal control signal |
| $t_7$ | | — |
| $t_8$ | access address | — |
| $t_9$ | | — |
| $t_{10}$ | | — |
| $t_{11}$ | | — |
| $t_{12}$ | gate output | internal control signal MYA |
| $t_{13}$ | | MVA |
| $t_{14}$ | | MZA, MZB, MZC, MZD, MZE |
| $t_{15}$ | | MVM |

The timing mechanism of the store M establishes a single function cycle and when completed switches itself off ($t_{15}$ = MVM), after it has started up units A through E ($T_{12}$ = MVA, $t_{13}$ = MVA, $T_{14}$ = MZA, MZB, MZC, MZD, MZE). Logic 101 gates TQA to unit A as TXA in the presence of MVA or if either the last AVA = 1 or if FVA = 1.

To understand the operation of the microprogram control unit, consider a starting conditions in which elements A, B, C, D, E, F and M are loaded, RWM exists at the interface, J, registers 21 and 12 of units B, C, D, E are empty and register 12 of unit A contains AVM = 1 and zeros otherwise. The next occurring TXA (TQA gated by logic 101) causes logic 100 to pass TQM to store M initiating a read cycle of store M to access the word W(RWM) at the location corresponding to RWM and, since AVA = 0, logic 101 inhibits TXA (TQA degated) causing unit A to become quiescent. When the word at RWM is available at the output of store M, the timing mechanism of store M generates MYA clearing register 21 of unit A. W(RWM) = (MWA, MWB, MWC, MWD, MWE) is gated by the timing mechanism into respective registers 21 of units A, B, C, D and E and MVA, MZA, MZB, MZC, MZD and MZE are generated by the timing mechanism initiating read cycles of units A, B, C, D and E to place words W(MZA), W(MZB), W(MZC), W(MZD) and W(MZE) in register 12 of units A, B, C, D and E. Unit A cycles because MVA gates TQA to unit A. When W(MZA) is in register 12 of unit A the next TXA (TQA gated by logic 101) will gate W(MZA) = (AVA, AVM, AVR, AXB, AYB, AXC, AYC, AXD, AYD, AXE, AYE) and will generally be of the form (1.0, nnnnnnnn,n,0,n,0, n,0,n,0) where n is either 1 or 0. AVR is stated to be an eight bit field (nnnnnnnn) but this field will be of a length appropriate to its function to be described later. The operations following depend on the valves of the n terms. Where n = 1 there will be action where n = 0 there will be no action. For example if AXB = 1 and AXC = 0, W(MZB) will be gated and unit B will cycle once in a manner depending on the value of the P bit in W(MZB) while unit C will remain exactly as it was. Unit A will cycle since AVA = 1 and in due time gate out W(MZA + a) causing further operations to be performed. After normally many cycles of unit A, a word will be gated out of register 12 of unit A of the form (1,0,nnnnnnnn,0,1,0,1,0,1,0,1) resetting the control unit to the starting state safe for unit A which cycles once more to enter the word (0,1,nnnnnnnn,0,0,0,0,0,0,0,0) into register 12 of unit A.

The above operations can be interrupted by predetermined sets of signals (RWF, EWF) which find a match in associative store F producing an output (FVR, FWM, FWA), FYA, FYB, FYC, FYD, FYE, FVA) of the form (nnnnnnnn,nnnnnnnn, nnnnnnnn,1,1,1,1,1,1) where the path for FVA incorporates a delay long enough for FYA to clear register 12 of unit A. Here again the field sizes of FVR and FWM are shown as eight bits but are in act as long as they need to be and W(FWA) = (0,1,00000000,0,0,0,0,0,0,0,0). There may be entries in associative store F which will match with (RWF,EWF) when EWF = 0.

When connected to a conventional processor, RWM is generated by the OP CODE decoder of the processor from that position of the instruction to be executed which defines the operation to be performed while RWF is generated by the various overflow, underflow and error latches distributed throughout the processor as well as by the processor register holding what can be referred to as "System status" or a statement of the current operating possibilities such as which interrupts may interrupt the current program being executed as well as to selected points in the data flow. AVR is connected to the gates throughout the processor. BVR is connected to the storage of the processor. CVR is connected to the masking (or part data flow selection) mechanism of the processor. DVR is connected to the arithmetic and logic circuitry (ALU) of the processor. It follows that the length of the AVR field is determined by the number of separately operable gates in the processor, one bit per gate. If two or more gates are always opened or closed together, they only need one controlling bit. Thus AVR controls the data flow throughout the processor but has nothing to do with the data which flows, how much of the flowing data is significant nor how such data is to be manipulated. Similar criteria obviously apply to BVR, CRV and DVR. FVR is used for testing purposes and the length of the FVR field is related to the number of tests to be performed.

The data loaded into stores M and F and units A to E depends on the instuction set of the processor. Since incrementing register 25 is normally set to generate the "next" address, sequentialy needed words are entered into sequentially adjacent locations. Units A, B, C, D and E are capable of looping, as has aleady been described, so that any of these units that is needed a number of times consecutively in any one operation need only be loaded once. Since each unit controls only one kind of function, its entries can be limited to the permutations and combinations involved in that function alone. Since MWA, MWB, MWC, MWD and MWE can all be different, functionally aligned sequences in units A to E need not be aligned by address. Since units B to E only provide an output when gated by AXB, AXC, AXD or AXE there is no need to fill them with the blank entries to preserve synchronism.

Since there is no hardware decoder to expand the signal array between the control unit and the processor, the instruction set can be changed at will be entering fresh data in stores M and F and units A to E provided always that the storage accommodation of each is large enough.

To illustrate some of these points consider the System 360 Standard Instruction Set now well known for many years and set out, for example, in document IBM X20-1703-5 (IBM being a Registered Trade Mark). There is provision made for 256 instructions though not all of the theoretically possible instructions are used. Suppose the average number of sequential operations for execution of each instruction was 20 and suppose only 40 control lines (equivalent to AVR = BVR = CVR = DVR = FVR = 8) are required. To provide a microprogram store of no sophistication whatsoever to handle this instruction set would require 256×20×40 bit storage positions arranged as 5120 words of 40 bits per word. Consider now the first instruction given namely (1A) ADD. The instruction provides three items, an OP CODE = (1A), a first register identifier $R_1$ and a second register identifier $R_2$. The manner of executing this instruction is generally as follows:

a. decode (1A) and enter the microprogram store at the corresponding position. Then under control of the microprogram store passing from entry to sequential entry, proceed as follows:
b. obtain ($R_1$) from the instruction register
c. enter that part of storage containing the registers and read the word in the register identified by ($R_1$)
d. cause word ($R_1$) to flow to hold register
e. obtain ($R_2$) from the instruction register
f. enter that part of storage containing the registers and read the word in the register identified by ($R_2$)
g. cause word ($R_2$) to flow to the ALU and release word ($R_1$) from the hold register and caue it to flow to the ALU
h. actuate the ALU to ADD
i. obtain ($R_1$) from the instruction register
j. enter that part of the storage containing the registers and access the register identified by ($R_1$) and release the output of the ALU and cause it to flow to and be written into register ($R_1$)
k. access the location holding the location in storage of the instruction just executed
l. cause this loction identifier to pass the ALU
m. actuate the ALU to increment this location identifier by a fixed amount
n. cause the output of the ALU to flow back to the location accessed in step (K)
o. obtain the location identifier from the location of step (n) and access the identifier location in storage
p. cause the output of the storage to flow to the instruction register
q. cause the OP CODE part of the instruction register to be gated to the OP CODE decoder.

Assume the 17 stated steps (a) and (q) each represent one entry in the microprogram store, this representing 17 × 40 bit positions. Of these, the field corresponding to DVR is empty save for steps (h) and (m) providing 15 × 8 enforced empty bit positions. The field corresponding to BVR is empty save for steps (c), (f), (j) and (o) if the current instruction identifier location is not in storage or steps (c), (f), (j), (k), (n), (o) and (p) if it is, these representing 13 × 8 or 10 × 8 enforced idle bit positions respectively. Further steps (k) to (q) and (a) have really nothing to do with instructions (1A) but occur at the end of the execution of each instruction since they represent the obtaining of the next instruction. From just this crude analysis of that is nearly the simplest instruction possible, it will be apparent that the proposal of the present invention presents a considerable saving. To start with there will be just one set of entries for steps (k) to (q) and not 56 repetitions of the set, the starts of the entries in each unit being determined by just one word in microrogram store M. This sequence will be entered into via a test determined by MWE and consequentially by MWF. Unit D contains just one entry DVR relating to the actual execution of this instruction and MWD points to this entry. CVR is not required and this contains no entry. BVR is required for steps (c), (f), (j) and will contain three entries, the entry for step (c) being pointed to by MWB. Unit A will contain 10 entries (Steps (b) to (j) and a linking step); MWA pointing to the entry corresponding to step (b).

Considering the iterative section of (1C) alone, it starts at a situation at which both operands have been obtained and are located in registers of the processor and uses four registers $R_1$, $R_2$, $R_3$, and $R_4$.

The steps involved are, in broad terms:
a. gate the mulipler ($R_3$)
b. select its highest bit
c. test its highest bit
d. gate $R_1$ and gate $R_2$ (containing multiplicand) if test = 1
e. shift and ADD
f. enter result into $R_1$
g. gate multiplier from $R_3$
h. shift multiplier spilling highest bit
i. return shifted multiplier to $R_3$
j. gate count from $R_4$

| AVA | AVM | AVR | AXB | AYB | AXC | AYC | AXD | AYD | AXE | AYE | STEP |
|---|---|---|---|---|---|---|---|---|---|---|---|
| 1 | 0 | nnnnnnnn | 0 | 0 | 0 | 0 | 0 | 0 | 0 | 0 | b |
| 1 | 0 | nnnnnnnn | 1 | 0 | 0 | 0 | 0 | 0 | 0 | 0 | c |
| 1 | 0 | nnnnnnnn | 0 | 0 | 0 | 0 | 0 | 0 | 0 | 0 | d |
| 1 | 0 | nnnnnnnn | 0 | 0 | 0 | 0 | 0 | 0 | 0 | 0 | e |
| 1 | 0 | nnnnnnnn | 1 | 0 | 0 | 0 | 0 | 0 | 0 | 0 | f |
| 1 | 0 | nnnnnnnn | 0 | 0 | 0 | 0 | 0 | 0 | 0 | 0 | g |
| 1 | 0 | oooooooo | 0 | 0 | 0 | 0 | 1 | 0 | 0 | 0 | h |
| 1 | 0 | nnnnnnnn | 0 | 0 | 0 | 0 | 0 | 0 | 0 | 0 | i |
| 1 | 0 | nnnnnnnn | 1 | 0 | 0 | 0 | 0 | 0 | 0 | 0 | j |
| 1 | 0 | nnnnnnnn | 0 | 0 | 0 | 0 | 0 | 0 | 1 | 0 | k |

Assume MWA = MWB = MWC = MWD = MWE = AVR = BVR = CVR = DVR = EWF = RWF = RWM = FWM = FVR = 8

It follows that the total bit positions requires to control the execution of steps (b) to (k) ((k) being the link) is

| Store M | 5 × 8 | = | 40 |
|---|---|---|---|
| Unit A | 10 × 18 | = | 180 |
| Unit B | 3 × 8 | = | 24 |
| Unit C | 0 × 8 | = | 0 |
| Unit E | 1 × 8 | = | 8 |
| Store F | m × 32 | = | 32 m |
| | | | 252 + 32 m |

It is really not fair to include the contribution from store F because these 32 m bit positions are common to all instructions. Thus a truer theoretical figure is $$\frac{32}{256} m = \frac{m}{8}$$

where $m$ is the number of different values of RWF that must be considered. If the associative store F were of the kind which could provide selected universal "match" elements the value of $m$ could be greatly reduced. The worst value of $m$ for RWF = (nnnnnnnn) is $2^8$ = 256, given a worst theoretical value for "total" 282 as opposed to 9 × 40 = 360 for the basic conventional form of the microprogram store. However, bear in mind that instruction (1A) is one of the simplest instructions to execute. Consider multiply (instruction 1C) or move (instruction D2) both of which incorporate iterative looping, the number of iterations in the case of (1C) being equal to the possible number of bits in the multiplier operand and, in the case of D2, equal to the actual number of words to be moved and therefore, within reason, unlimited.

k. ADD 1 to count
l. return count to $R_4$
m. gate count
n. test count, if count = 32 (for a 32 bit multiplier) stop iteration.

In the control unit of FIG. 3 this iteration requires one word in the microprogram store, 14 words in Unit A, no words in Unit B if $R_1$, $R_2$, $R_3$ and $R_4$ ca be gated directly as will be the case for most processors, one word in the Unit C (step b), two words in Unit D (steps (e) and (d)) two words in Unit E (steps (c) and (h)) and two words in associative store F.

The store F words are accessed or matched in steps (c) and (n) respectively and the resulting outputs are used in steps (d) and (n + 1) respectively, gating $R_2$ in step (d) and reaccessing store M in steps (n + 1) when the results of the respective tests so indicate. A basic microprogram store would require 32 = 14 words instead of the specified 22 words. A better comparison would be with the kind of microprogram store which generates its own next address from its own contents i.e., one which has a branch on condition facility. Such a store might only need 14 entries but now each entry would comprise (40 = L) bits, where L bits are required for internal addressing. In this case the comparison is between 14 × (40 + L) bits and (40 + 14×18 + 0×8 + 1×8 + 2×8 + 2×32) = 14×28 + 4 or a saving of (12 + L) × 14 − 4 bits.

In all, for such an instruction, three words will be required in store M, one controlling the operation up to the start of the iteration, one controlling the iteration and one controlling the operation after the iteration up to the time when the linking operation which is used between each instruction execution in invoked.

The typical move instruction provides a count and two storage addresses and causes words from successive storage locations starting at one given address to be moved to successive storage locations starting at the other given address, the number of words being moved being equal to the count, one word at a time being moved. It will be apparent that such an operation is conveniently handled by a control unit of the kind shown in FIG. 3.

Such a control unit can be given greater power at little extra cost by adding further units and further splitting functions. Take Unit B for example, which controls the accessing of storage. This operation involves two separate matters, controlling the functions of the storage as a piece of hardware and pointing to the actual location in storage that is to be accessed. Controlling storage for a standard processor having two stores involves four routines, READ and WRITE for each store. In some cases the address pointing at the location to be accessed comes directly from the control unit and in other cases comes from a location identified by the control unit. Thus, providing two units B1 and B2, one controlling READ and WRITE for each store, and the other providing the corresponding addresses either directly or indirectly, will either decrease the number of entries needed for a standard instruction set, or enable a more complex instruction set to be handled for the same number of entries. It is thought that only units B, C, and D can be advantageously subdivided.

Hence, the microprogram control unit of this invention may be looked upon as having a tree organization, in which unit M is the apex of the tree and units A, B, C, D and E are vertices which are son nodes of the parent apex M. Unit F is a son vertex of node E. Further, subdivisions of any unit will provide son nodes of that unit.

Another facility that can be incorporated is to enable such a control unit to handle two instruction sets by melding signals identifying the program from which the current instruction comes and hence the instruction set being handled with MWA, MWB, MWC, MWD and MWE.

For example, if the melding results in the high order bits of the actual address used being derived from the program identifying signals, then the control signal fields for one instruction set will be stored in the low order half of each unit and the control signal fields for the other instruction set will be stored in the high order half of each unit.

To summarize, the present invention provides a microprogram control unit which is effectively an interactive processor in that it incorporates units which are in part self-controlling and in part controlled by other similar units at least in so far as the generation of a sequence of outputs therefrom is temporarily suspendable in response to the nature of the output from another unit.. A microprogram store is provided but it does not produce control signals for the processor to be controlled thereby. It merely establishes entry points into the operation of the several units of the processor or, in other words, acts as the microprogram store of the processor. Each unit of the processor has control of a particular function and generates the control signals for that function directly, no hardware decoder being interposed between the unit and the processor elements controlled thereby. The criteria of a function suitable for isolation and for handling by its own unit are:

i. Does the function have a cycle of operation which repeats during the execution of a given instruction, or ii. Does the function have cycles of operation which are common to the execution of a number of instructions, or iii. Is the function one which is required only from time to time, but when it is required, calls for an appreciable number of control signals to be generated?

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. A microprogram control unit for controlling a system containing a processor, comprising
   a microprogram store,
   a plurality of microprogram auxiliary units, auxiliary selecting means connecting the auxiliary units to the microprogram store for selecting an auxiliary unit under control of the microprogram store to issue and process microinstruction signals contained in the auxiliary unit to thereby generate system control signals for a microprogram control interface to the system,
   groups of processing elements organized by function in the system,
   each auxiliary unit producing signals related to a particular group of processing elements and for initiating one or more other connecting auxiliary units to initiate the cycling of the connected auxiliary unit, and
   means connecting the auxiliary units together in the microprogram control unit and to an associated one of the groups of processing elements for interactively initiating other auxiliary units for controlling the groups of processing elements.

2. A microprogram control unit as claimed in claim 8, in which
   means for coupling two of the auxiliary units together for accessing of an associated auxiliary unit to reset the two auxiliary units.

3. A microprogram control unit as claimed in claim 1, further comprising,
   means for melding microinstructions from an associated microprogram auxiliary unit with processor instruction set identifying signals derived from the processor actuation of the microprogram control unit.

4. A microprogram control unit as claimed in claim 1, further including
   an associative store adapted to receive search fields from both the processor controlled by the microprogram control unit and from at least one of the auxiliary units for generating control signals effective to access the microprogram store to control an initiation of another of the auxiliary units to produce system control signals.

5. A microprogram control unit as claimed in claim 1, in which the auxiliary units further comprise
   self-addressing non-destructive read out data stores,
   means for accessing the data stores in response to a microinstruction currently being execute in the microprogram store to produce an output when an external control signal is applied to the microprogram store,
   and means for deriving such external control signal from at least one group of the processing elements under actuation of signals from one of the auxiliary units.

* * * * *